Sept. 24, 1946.  H. N. SUDDUTH  2,408,129

AIR BRAKE

Filed Jan. 1, 1945

Inventor
Henry Norton Sudduth

Attorneys

Patented Sept. 24, 1946

2,408,129

UNITED STATES PATENT OFFICE 2,408,129

AIR BRAKE

Henry Norton Sudduth, Watertown, N. Y., assignor to The New York Air Brake Company, a corporation of New Jersey Application January 1, 1945, Serial No. 570,815

10 Claims. (Cl. 303—68)

This invention relates to release valves, primarily intended for use in releasing automatic air brakes on cars preparatory to setting them out of a train for switching operations, and available also to release stuck brakes without bleeding reservoirs.

While the invention is adaptable to release valves generally such as those shown in the Baker and Thompson Patent 2,287,775, June 30, 1942, and the Sudduth Patent 2,293,778, August 25, 1942, it is most simply incorporated into release valves which are interposed in the brake cylinder pipe according to the disclosure of the Pickert Patent 2,302,377, November 17, 1942, and will be described as embodied in the valve described and claimed in Pickert's application Ser. No. 565,087, filed November 25, 1944, now Patent No. 2,392,185, issued Jan. 1, 1946, since that valve is now expected to approximate the commercial form.

All the patented valves conserve the reservoir charge, and this characteristic though highly beneficial, introduces a new difficulty which the present invention overcomes.

Freight trains are customarily operated in level country with brake pipe pressures (running pressure) of 70 pounds per square inch. In heavy grade work 90 pounds per square inch is used as the running brake pipe pressure.

If a car equipped with one of these release valves comes in from a heavy grade run at 90 pounds running pressure, is cut out with use of the release valve, and then is cut into a train operating with a 70 pound brake pipe pressure, the control valve on that car commonly will not shift to release position because the retained pressure in the auxiliary reservoir (or service reservoir) is as high as or higher than this brake pipe pressure. Thus such a car would require reservoir bleeding to condition its brakes to operate.

The present invention accomplishes the bleeding operation automatically and has the additional advantage of always establishing a condition favorable to releasing movement of the control valve.

In its broadest aspects the release valve, when in its releasing position but at no other time, renders a loaded relief valve effective to reduce pressure in at least the service reservoir of a multiple reservoir brake (or the auxiliary reservoir of a single reservoir brake) to an amount somewhat lower than the lowest running brake pipe pressure used. Desirably it reduces the pressure in both the service and the emergency reservoir of a two reservoir brake such as the AB brake. The illustrated embodiments so operate when manipulated according to the recommended procedure.

The extent of the bleeding down should be no more than is necessary to ensure release by the lower brake pipe running pressure. A blow down to a pressure between 55 and 60 pounds should be sufficient to ensure releasing action at 70 pounds. The suggested range allows for unavoidable variations in the action of the blowdown valve, caused by sticky valves and other disturbing factors.

The invention will now be described by reference to the accompanying drawing, in which.

Figures 1, 2:
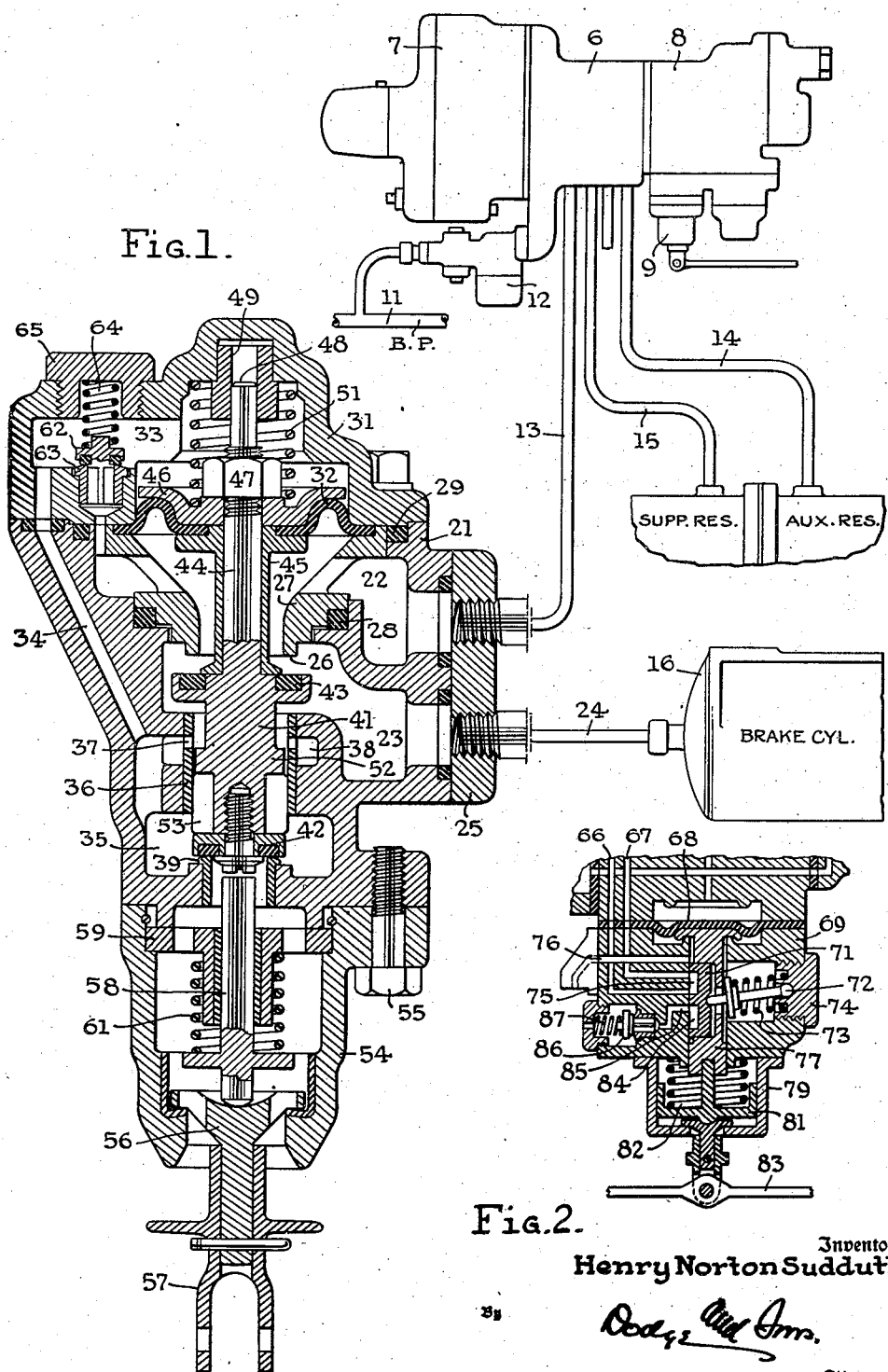
Figure 1 is an axial vertical section of the release valve in its normal position, the valve being shown connected to an AB control valve and to a brake cylinder, each drawn in miniature to save space, while illustrating essential connections.
Figure 2 is a section showing one way of applying the invention to release valves of the Baker and Thompson Patent 2,287,775 or the Sudduth Patent 2,293,778.

Refer first to Fig. 1.

The pipe bracket of an AB control valve is indicated at 6, the body of the emergency portion is indicated at 7, and the body of the service portion at 8. The usual reservoir bleed valve is indicated at 9. This bleed valve need not be dispensed with, but it would be supplanted for most purposes by the release valve of the present invention.

The brake pipe is indicated at 11 and has a branch which leads through a dust collector 12 to the pipe bracket. The brake cylinder connection appears at 13, the auxiliary reservoir connection at 14, and the supplemental reservoir connection at 15. Fragments of the two reservoirs appear in the drawing and are identified by legends.

A portion of the brake cylinder is indicated by the numeral 16.

All the parts so far described are of known construction, the AB control valve being standard on American railroads.

The release valve forming the subject of the present invention is interposed between the brake cylinder connection 13 and the brake cylinder 16.

The main body of the valve is indicated at 21 and is in the form of a casting, having a chamber 22 with which the pipe 13 communicates and a chamber 23 in free communication by a pipe 24 with the brake cylinder 16.

The body 21 is mounted on a pipe bracket 25 conventionally indicated in the drawing, the pipes 13 and 24 being connected to the bracket. The bracket could assume various forms and no attempt to illustrate it in detail has been made.

The chambers 22 and 23 are separated by a downwardly presented valve seat 26. This seat is shown as formed on an insert or spider 27 which is sealed by gaskets 28 and 29 and which is clamped by a cap 31 of the form clearly shown in the drawing.

The cap 31 is bolted to the top of the housing 21 and clamps the peripheral margin of a flexible diaphragm 32 shown as of the slack or corrugated type.

The lower side of the diaphragm is subject to the pressure in the chamber 22. The diaphragm is subject on its upper side to pressure in a chamber 33 which is connected by a passage 34 with a chamber 35 formed in the lower end of the housing 21. The chamber 23 and the chamber 35 communicate with each other through the bore of a bushing 36 which is pressed into an opening extending between these two chambers. The bushing 36 has lateral ports 37 which communicate with an annular passage 38 and through the passage 38 with passage 34 and consequently with the chambers 33 and 35.

Controlling discharge from the bottom of the chamber 35 is an upwardly presented valve seat 39 formed on the upper end of a bushing which is pressed to place. A valve body 41 carries on its lower end a rubber faced valve 42 which normally seals against seat 39 and carries at its upper end a rubber faced valve 43 which may close against the seat 26 at which time the valve 42 will be lifted from its seat 39.

The valve 42 is shown in the drawing as a separate component connected to the valve body 41 by a machine screw. The valve 43 is formed integrally with the body. An upwardly extending stem 44 passes through the center of the diaphragm 32 and is clamped to the center of the diaphragm by a flanged sleeve 45, a thrust plate 46, which overlies the diaphragm, and a nut 47.

The extreme upper end of the stem 44 projects above the nut 47 and is reduced in diameter as indicated at 48. This reduced end 48 is guided in a bushing 49 pressed into the cap 31. A biasing spring 51 of moderate strength urges the diaphragm 32, the stem 44 and the valve body 41 downward so that the valve 42 is normally seated and the valve 43 is normally unseated. The valve body 41 has a peripheral flange or rim 52 which encircles it between the valves 42 and 43, the flange being so located that when valve 42 is closed, the flange 52 fully exposes the ports 37. However if the body 41 is moved upward sufficiently to close the valve 43 against the seat 26, the ports 37 are throttled but not completely closed.

The valve body 41 is centered and guided in the bushing 36 by radial wings 53.

A housing 54 of the form shown is attached to the bottom of the housing 21 by machine screws, one of which appears at 55. The housing 54 has an internally flanged opening in its lower end in which is mounted a universally tiltable actuator comprising a ported head 56 which seats at its margin on the internal flange in housing 54 and which has at its lower end a fork 57 to which an actuating rod may be attached.

Resting on the head 56 is the lower end of a stem 58 which is guided by a guideway formed in a spider 59 clamped between the housings 21 and 54. The rim of the spider has throughports as shown. The stem 58 is biased downward by a spring 61. If the head 56 is tilted in any direction the effect is to force the stem 58 upward, and since the stem 58 is aligned with the valve body 41, the effect of tilting the head 56 is to force the valve body 41 upward against the resistance of spring 51 so as to open the valve 42, throttle the ports 37 and close the valve 43.

The structure so far described is disclosed in Pickert's pending application above identified. With such a device it is possible to incorporate the bleed valve as a simple spring-loaded relief valve controlling flow from chamber 22 to chamber 33.

The relief valve is shown at 62, and its seat at 63. It is loaded by a coil spring 64 held in socketed threaded plug 65 screwed into cap 31. The spring is of such strength as to permit the valve to open when pressure in chamber 22 predominates over that in chamber 33 by 60 pounds or more. This value is suggestive and based on considerations already outlined. It is a function of the lowest brake pipe running pressure and the releasing characteristics of the related control valve such as 7, 8.

*Operation of device of Figure 1*

The parts are shown in their normal positions. Suppose that a brake application is made by reducing pressure in the brake pipe 11. The AB control valve will function in the normal way to admit air under pressure to the pipe 13. This air will flow to chamber 22, thence past valve seat 26 into chamber 23 and by pipe 24 to the brake cylinder 16 causing application of the brakes. At the same time air will flow freely through the ports 37 to the space 33 above the diaphragm 32. Consequently the admission of pressure to the pipe 13 will develop little if any upward-acting pressure differential on the diaphragm 32.

In using the Pickert device as originally contemplated the relief valve was actuated preferably before the train pipe was completely vented, so as to preserve all the reservoir air possible.

With the present device applied to an AB brake it is preferable but not strictly necessary first to produce an emergency application by venting the brake pipe in any preferred way, after which the release valve is actuated. The purpose in using this sequence is to ensure connection of both the emergency and service reservoirs with the bleed valve, so that both will be bled. Then there can be no flow from the emergency reservoir to the service reservoir by back flow through the charging passage after the control valve moves to release position.

Assume that a train has come in, an emergency application has been made, and on a car to be cut out, the release valve has been actuated by tilting head 56. This forces up the valve body 41. The effect of this is to isolate chambers 22 and 33 from each other (except that valve 62 will relieve any pressure differential in excess of 60 pounds per square inch), throttle but not close the ports 37 and rapidly vent space 33 by way of passage 34 to chamber 35 and from chamber 35 through seat 39 to atmosphere through the ported spider 59 and the ported head 56. This establishes a retaining upward differential pressure on the diaphragm 32 sufficient to hold the valve 43 closed. Obviously this differential pressure must overcome the stress of the spring 51 and the pressure acting on the small area of valve 43 which is exposed within seat 26. The parts are designed to meet this requirement.

The effect is to disconnect the chambers 22 and 23 and exhaust the chamber 23 by flow past flange 52 to chamber 35 and thence to atmosphere. Consequently the brake cylinder will remain vented as long as pipe 13 remains under pressure. The service and emergency reservoirs will be bled to 60 pounds per square inch by valve 62 since both the service and emergency portions of the control valve are in emergency position, so that the reservoirs communicate with pipe 13.

The control valve will certainly thereafter shift to release position under a brake pipe pressure of 70 pounds. This shift will vent pipe 13 and chamber 22 whereupon spring 51 will reset the release valve to the position shown in the drawing.

While the use of the device above described entails the waste of some reservoir air, it saves most of the charge and ensures that brakes will never accidentally remain cut out.

Further it improves the action of the Pickert type of releasing valve in releasing a stuck brake as will be apparent from a consideration of the following.

As is well known, stuck brakes usually occur as the result of an effort to release a light application. Assume for example that in making a light application with an AB brake the quick service limiting valve functioned to supply brake pipe air to the brake cylinder up to 10 pounds. In such case, if the service portion remained in quick service position, pressure in the service reservoir would be depleted only slightly so that when release was attempted the service portion stalled in service lap position. Assuming the resulting stuck brake to be observed by an inspector or brakeman, his normal action would be to actuate the release valve on that car. Even as low a brake cylinder pressure as ten pounds would retain the release valve in venting position.

With the Pickert device the vent valve would probably remain in the venting position for the remainder of the run. The valve of the present application, on the other hand, would cause the control valve to release.

The action is as follows. The quick service limiting valve holds the pressure in the brake cylinder connection at 10 pounds, but leakage past the service piston will in time charge the service reservoir. On the next ensuing reasonably heavy application the service portion will move to service position. Flow to the brake cylinder is blocked at the release valve, but valve 62 will bleed the service reservoir to 60 pounds. When, thereafter, brake pipe pressure is raised to 70 pounds to cause release, the previously stuck service portion will move to release position under a 10 pound differential. This causes the release valve to reset and restores the brake equipment on the car to operative condition.

*Modified embodiment of Figure 2*

In this embodiment the parts 66 to 83 are numbered as they are in Sudduth Patent 2,293,778; that is to say 66 is the brake cylinder passage of the control valve and 67 is the passage leading to the brake cylinder, 68 is the resetting diaphragm, 69 is the housing of the release valve, 71 is the slide valve forming part of the release valve, 72 is the slide valve strut, 73 is the strut spring, and 74 is the strut cap. 75 is the cavity on the slide valve which normally connects the ports 66 and 67 and which in the abnormal or releasing position of the valve connects the brake cylinder port 67 with the exhaust port 76. 77 is the diaphragm plunger. 79 is the guide housing. 81 is the release valve shifting plunger. 82 is the plunger spring and 83 is the pull rod which may be operated to force the member 81 upward and shift the valve to its releasing position.

All the parts so far described correspond to the parts in the Sudduth patent above identified and to similar parts in the Baker and Thompson patent.

Pressure may be admitted above the diaphragm 68, to reset the valve, in either of the two ways specified in the Baker and Thompson patent or in the manner specified in the Sudduth patent. The essential change is that the slide valve 71 is formed with a second cavity 84 which coacts with a valve seat port 85. The port 85 leads to atmosphere past a poppet relief valve 86 which is loaded by a spring 87 so that it will open when subjected to a pressure of say 60 pounds. In other words the valve 86 is the direct analogue of the valve 62 in Figure 1 and the degree of loading of the valve is determined by the same considerations.

The structure shown in Figure 2 may be incorporated in either the Baker and Thompson valve or the Sudduth valve and operates as follows.

Assume that a train having a car equipped as indicated comes into a terminal where it is to be cut out for switching. The first procedure is to make an emergency application. This connects the port 66 with the service reservoir and the emergency reservoir. The next step is to pull or push the rod 83. At such time the chamber above the diaphragm 68 would be vented so that the valve 71 would move to its uppermost position and stay there. In this position the brake cylinder port 67 is connected to the atmospheric exhaust port 76 and the port 66 is connected to the bleed port 85. Consequently the brake cylinder would be completely exhausted and the auxiliary and supplemental reservoirs associated with the AB brake valve would be blown down to 60 pounds pressure or whatever the loading of the valve 86 might be. Restoration of brake pipe pressure when the car is again cut into a charged train would cause the diaphragm 68 to be forced down. This would reset the valve 71 so that the ports 66 and 67 are connected in their normal relation while the port 85 would be blanked. In other words all that is necessary to apply the present invention to the Baker and Thompson valve or to the Sudduth patented valve is to supply means in the release valve to bleed at least the auxiliary reservoir of the brake controlling valve device sufficiently to ensure release at the lowest brake pipe running pressure.

The arrangement illustrated in Figure 2 is believed to be simple and desirable, but it is not the only possible arrangement to effect the desired result.

The embodiment shown in Figure 1 shows how the invention may be applied to the Pickert patented release valve, and specifically to the improved embodiment thereof shown in Pickert's pending application.

Figure 2 illustrates a simple mode of applying it to the Baker and Thompson and to the Sudduth patented structures.

Although specific examples have been described in considerable detail, these disclosures are intended to be illustrative and not limiting. The scope of the invention will be defined solely in the claims.

What is claimed is:

1. The combination of a brake pipe adapted to be operated at two different running pressures; a brake controlling valve device of the automatic type connected with said brake pipe and capable of being controlled by reductions and restorations of pressure in said brake pipe from and to either of said running pressures; reservoir means arranged to be charged through said valve device and comprising at least one reservoir; a brake cylinder operable under control of the valve device by air derived from said reservoir means; a relief valve adapted to open when subjected to pressures exceeding a chosen value which is lower than the lower of said two brake-pipe running pressures; release valve means having a normal position in which it connects the brake cylinder to be controlled by said controlling valve device, the release valve means being movable from said normal position to an abnormal position in which it disconnects and vents the brake cylinder and establishes a path through which reservoir pressure may be reduced by flow through the relief valve; manually operable means for shifting said release valve means to and leaving it in said abnormal position; and means rendered effective by the development of releasing pressure in the brake pipe to restore said release valve means to normal position.

2. The combination of a brake pipe adapted to be operated at two different running pressures; a brake controlling valve device of the automatic type connected with said brake pipe and capable of being controlled by reductions and restorations of pressure in said brake pipe from and to either of said running pressures; reservoir means arranged to be charged through said valve device and comprising at least one reservoir; a brake cylinder operable under control of the valve device by air derived from said reservoir means; a relief valve adapted to open when subjected to pressures exceeding a chosen value which is lower than the lower of said two brake-pipe running pressures; release valve means having a normal position in which it connects the brake cylinder to be controlled by said controlling valve device, the release valve means being movable from said normal position to an abnormal position in which it disconnects and vents the brake cylinder and establishes a path through which reservoir pressure may be reduced by flow through the relief valve; manually operable means for shifting said release valve means to and leaving it in said abnormal position; and means rendered effective by releasing action of the control valve to restore said release valve means to normal position.

3. The combination of a brake pipe adapted to be operated at two different running pressures; a brake controlling valve device of the automatic type connected with said brake pipe and capable of being controlled by reductions and restorations of pressure in said brake pipe from and to either of said running pressures; reservoir means arranged to be charged through said valve device and comprising at least one reservoir; a brake cylinder operable under control of the valve device by air derived from said reservoir means; a relief valve adapted to open when subjected to pressures exceeding a chosen value which is lower than the lower of said two brake-pipe running pressures; release valve means having a normal position in which it connects the brake cylinder to be controlled by said controlling valve device, the release valve means being movable from said normal position to an abnormal position in which it disconnects and vents the brake cylinder and establishes a path through which reservoir pressure may be reduced by flow through the relief valve; means serving to bias the release valve means to normal position; manually operable means for shifting the release valve means to abnormal position; and pressure actuated means controlled by the control valve and effective to retain the release valve means in said abnormal position against said bias, except when the control valve is in brake releasing positions.

4. In a release valve for interposition between a control valve and a brake cylinder, the combination of a body having a control valve connection and a brake cylinder connection; a pressure responsive relief valve adapted to open when subjected to pressures exceeding a chosen value; and release valve means in said body shiftable between a normal position in which it connects said connections with each other and a releasing position in which it disconnects said connections from each other and connects the brake cylinder connection to atmosphere and the control valve connection with said relief valve.

5. In a release valve for interposition between a control valve and a brake cylinder, the combination of a body having a control valve connection and a brake cylinder connection; a pressure responsive relief valve adapted to open when subjected to pressures exceeding a chosen value; release valve means in said body shiftable between a normal position in which it connects said connections with each other and a releasing position in which it disconnects said connections from each other and connects the brake cylinder connection to atmosphere and the control valve connection with said relief valve; manually controlled means for shifting said release valve to and leaving it in releasing position; and means rendered effective by substantially complete venting of the control valve connection to restore said release valve to normal position.

6. The combination of a normally charged brake pipe; a control valve of the automatic type connected therewith; a brake cylinder adapted to be connected with the control valve; reservoir means including at least one reservoir arranged to be charged from the brake pipe through the control valve and adapted to supply operating air to the brake cylinder under control of the control valve; a release valve housing having a connection to the control valve and a connection to the brake cylinder; a relief valve adapted to open when subjected to pressures exceeding a chosen value which is somewhat lower than the lowest running pressure used in the brake pipe; release valve means shiftable in said housing between a normal position in which it connects the brake pipe and control valve connections with each other and a releasing position in which it disconnects said connections from each other and connects the brake cylinder connection to atmosphere and the control valve connection with said relief valve; manually operable means for shifting said release valve to and leaving it in releasing position; and means rendered effective by the development of brake releasing pressure in the brake pipe to restore said release valve to normal position.

7. The combination of a normally charged brake pipe; a control valve of the automatic type connected therewith; a brake cylinder adapted to be connected with the control valve; reservoir means including at least one reservoir arranged to be charged from the brake pipe through the control valve and adapted to supply operating air to the brake cylinder under control of the control valve; a release valve housing having a connection to the control valve and a connection to the brake cylinder; a relief valve adapted to open when subjected to pressures exceeding a chosen value which is somewhat lower than the lowest running pressure used in the brake pipe; release valve means shiftable in said housing between a normal position in which it connects the brake pipe and control valve connections with each other and a releasing position in which it disconnects said connections from each other and connects the brake cylinder connection to atmosphere and the control valve connection with said relief valve; manually operable means for shifting said release valve to and leaving it in releasing position; and means rendered effective by releasing action of the control valve to restore said release valve to normal position.

8. The combination of a normally charged brake pipe; a control valve of the automatic type connected therewith; a brake cylinder adapted to be connected with the control valve; reservoir means including at least one reservoir arranged to be charged from the brake pipe through the control valve and adapted to supply operating air to the brake cylinder under control of the control valve; a release valve housing having a connection to the control valve and a connection to the brake cylinder; a relief valve adapted to open when subjected to pressures exceeding a chosen value which is somewhat lower than the lowest running pressure used in the brake pipe; release valve means shiftable in said housing between a normal position in which it connects the brake pipe and control valve connections with each other and a releasing position in which it disconnects said connections from each other and connects the brake cylinder connection to atmosphere and the control valve connection with said relief valve; means serving to bias the release valve to normal position; manually operable means for shifting the release valve to releasing position; and pressure controlled retaining means effective to hold the release valve in releasing position against said bias while said control valve connection is subject to fluid pressure.

9. A release valve comprising in combination a valve housing having a control valve connection, a brake cylinder connection, a valve seat controlling a free communication between said connections and an opposed valve seat controlling a vent from the brake cylinder connection; a double beat poppet valve adapted to close against said seats selectively, said valve having a normal position in which it closes against the second named valve seat and a releasing position in which it closes against the first named valve seat; yielding means biasing said valve toward normal position; a movable abutment connected to said valve and always subject to pressure in the control valve connection in a direction to urge the valve toward abnormal position; means forming a chamber on the opposite side of said abutment and in free communication with the vent valve seat; a loaded relief valve arranged to permit flow from said control valve connection to said chamber when the pressure differential between the two exceeds a chosen value; means associated with the double beat valve and serving to place said chamber in free communication with the brake cylinder connection when the valve is in normal position, and to restrict said communication at other times; and means for forcing said valve toward said abnormal position.

10. A release valve mechanism for interposition between a control valve and a brake cylinder whose pressure is normally controlled thereby, said mechanism comprising an expansible chamber motor having two working spaces separated by a movable abutment, the first working space being subject to braking pressures developed by the control valve; a loaded relief valve arranged to permit flow from the first working space to the second working space when the pressure differential between them exceeds a chosen value; valve means connected with said abutment to be shifted between two positions by reverse movements of the abutment, namely a normal position assumed when the abutment is shifted toward the first working space and in which the valve means connects the brake cylinder and the control valve and also connects the two working spaces, and an abnormal position in which the valve means interrupts the two connections just mentioned and vents the brake cylinder and the second working space; yielding means insufficient to resist effective braking pressure in the first working space and biasing the abutment toward the first working space to position the valve means in normal position; and manually operable means for effecting a shift of said valve means to abnormal position.

HENRY NORTON SUDDUTH.